(12) United States Patent
Baszucki

(10) Patent No.: US 10,796,524 B2
(45) Date of Patent: Oct. 6, 2020

(54) METHODS AND APPARATUS FOR INTERACTING WITH NETWORK-CONNECTED CONSUMERS

(71) Applicant: David Baszucki, Portola Valley, CA (US)

(72) Inventor: David Baszucki, Portola Valley, CA (US)

(73) Assignee: Roblox Corporation, San Mateo, CA (US)

( * ) Notice: Subject to any disclaimer, the term of this patent is extended or adjusted under 35 U.S.C. 154(b) by 102 days.

(21) Appl. No.: 15/290,634

(22) Filed: Oct. 11, 2016

(65) Prior Publication Data

US 2018/0102023 A1    Apr. 12, 2018

(51) Int. Cl.

| | |
|---|---|
| *G07F 17/32* | (2006.01) |
| *G06Q 30/02* | (2012.01) |
| *A63F 13/33* | (2014.01) |
| *A63F 13/80* | (2014.01) |
| *A63F 13/335* | (2014.01) |

(52) U.S. Cl.
CPC .......... *G07F 17/3225* (2013.01); *A63F 13/33* (2014.09); *A63F 13/80* (2014.09); *G06Q 30/0209* (2013.01); *G06Q 30/0241* (2013.01); *G07F 17/3244* (2013.01); *A63F 13/335* (2014.09); *A63F 2300/8082* (2013.01)

(58) Field of Classification Search
None
See application file for complete search history.

(56) References Cited

U.S. PATENT DOCUMENTS

2012/0304225 A1\* 11/2012 Ritter ............... H04N 21/25866
725/35
2014/0177813 A1\* 6/2014 Leeds ..................... H04M 3/02
379/67.1

\* cited by examiner

*Primary Examiner* — James S. McClellan
*Assistant Examiner* — Peter J Iannuzzi
(74) *Attorney, Agent, or Firm* — Donald R. Boys; Central Coast Patent Agency LLC

(57) ABSTRACT

A system has a computerized game server with a processor coupled to a data repository, the server executing software on the processor, serving video games to a player operating a computerized appliance having a display screen, the computerized appliance coupled to the computerized server over a wide area network (WAN), and providing interactive interfaces enabling interaction between the system and players, and a sensory presentation comprising one or both of audio and images accessible to the player, the sensory presentation including an artifact hidden in one or more of the images, or in the audio in the sensory presentation. The player finds the artifact hidden in the sensory presentation, communicates the act of finding the artifact and circumstances of the act to the computerized game server, where the game server provides a predetermined reward to the player for the act of finding the artifact.

12 Claims, 5 Drawing Sheets

METHODS AND APPARATUS FOR INTERACTING WITH NETWORK-CONNECTED CONSUMERS

BACKGROUND OF THE INVENTION

1. Field of the Invention

The present invention is in the field of Internet video gaming and associated consumable media, and pertains particularly to methods and apparatus for interacting with clients and potential clients through associated consumable media.

2. Discussion of the State of the Art

The art of online video gaming has grown considerably with the advent of three-dimensional virtual reality (VR) environments and VR systems for accessing and interacting with those environments. Online gaming providers rely on building a large client base and retaining that client base by determining different ways of keeping that base excited and actively using their services. The key is the customer experience. Likewise, mechanisms for acquiring new clients such as free game play sections, sponsored game play for friends of clients and the like are used to continue growing the client base.

The inventors realize that their client base has common traits and habits, one of which is that the clients consume online media evidenced by their game play history. Therefore, it is considered likely or probable that gaming clients also consume movies, movie clips, and other forms of digital media online or through a broadcast medium such as television. It has occurred to the inventors that it may be desirable to interact with current clients through other forms of media that they may consume. Also it may be desirable to attract new clients through media that they may consume. Therefore, what is clearly needed is a method and apparatus for interacting with existing and potential clients through media presentations outside the game base.

BRIEF SUMMARY OF THE INVENTION

In an embodiment of the invention a system is provided, comprising a computerized game server having a processor coupled to a data repository, the server executing software on the processor, serving video games to a player operating a computerized appliance having a display screen, the computerized appliance coupled to the computerized server over a wide area network (WAN), and providing interactive interfaces enabling interaction between the system and players, and a sensory presentation comprising one or both of audio and images accessible to the player, the sensory presentation including an artifact hidden in one or more of the images, or in the audio in the sensory presentation. The player finds the artifact hidden in the sensory presentation, communicates the act of finding the artifact and circumstances of the act to the computerized game server, where the game server provides a predetermined reward to the player for the act of finding the artifact.

In one embodiment the sensory presentation is a digital, visual presentation presented on the display screen of the computerized appliance operated by the player, and the artifact is a digital, visual artifact hidden in an image in the digital, visual presentation. Also in one embodiment the digital, visual presentation is one of a movie, a video presentation or an image in a page of a web site on the Internet network. Also in one embodiment the digital, visual artifact is interactive, and selection of the interactive digital artifact by the player initiates navigation on the WAN, communicating the act of finding the artifact and circumstances, including the player's identification, to the computerized game server. And in one embodiment the sensory presentation is a passive image, and communication by the player of the act of finding is by input at one of the interactive interfaces at the computerized game server.

In one embodiment the passive image is an image on a billboard, in a newspaper, in a magazine, or in a printed advertisement. Also in one embodiment the sensory presentation is an audio presentation, and the artifact is a short audio clip somewhere in the audio of the presentation. Also in one embodiment the predetermined reward comprises one or more of virtual currency, enhanced capability in game play, and recognition posted through one of the interactive interfaces provided by the first server. In one embodiment the artifact is associated specifically with a game or a group of related games at the computerized server. And in one embodiment a clue to the existence of and possible location of an artifact is communicated to the player during play of the game with which an artifact is specifically associated.

In one embodiment of the invention time constraints are enforced on rewards, such that a reward may only become available for a predetermined period of time after the act of finding is communicated to the computerized game server, or may be available only for a predetermined period of time, once made available. Also in one embodiment artifacts and rewards are related such that a predetermined number of a first artifacts must be found and redeemed for a first reward before a second artifact becomes available to be found and redeemed for a second reward.

In another aspect of the invention a method is provided, comprising serving a video game to a player by a computerized game server having a processor coupled to a data repository, the computerized game server executing software on the processor, serving video games to a player operating a computerized appliance having a display screen, the computerized appliance coupled to the computerized server over a wide area network (WAN), and providing interactive interfaces enabling interaction between the system and players, hiding an artifact in one or more of images or audio in a sensory presentation comprising one or both of audio and images accessible to the player, finding the hidden artifact by the player, communicating the act of finding the artifact and circumstances of the act to the computerized game server, and providing, by the computerized game server, a predetermined reward to the player for the act of finding the artifact.

In one embodiment of the method the sensory presentation is a digital, visual presentation presented on the display screen of the computerized appliance operated by the player, and the artifact is a digital, visual artifact hidden in an image in the digital, visual presentation. Also in one embodiment the digital, visual presentation is one of a movie, a video presentation or an image in a page of a web site on the Internet network. Also in one embodiment the digital, visual artifact is interactive, and selection of the interactive digital artifact by the player initiates navigation on the WAN, communicating the act of finding the artifact and circumstances, including the player's identification, to the computerized game server. And in one embodiment the sensory presentation is a passive image, and communication by the player of the act of finding is by input at one of the interactive interfaces at the computerized game server.

In one embodiment of the method the passive image is an image on a billboard, in a newspaper, in a magazine, or in a printed advertisement. Also in one embodiment the sensory presentation is an audio presentation, and the artifact is a short audio clip somewhere in the audio of the presentation. In one embodiment the predetermined reward comprises one or more of virtual currency, enhanced capability in game play, and recognition posted through one of the interactive interfaces provided by the first server. Also in one embodiment the artifact is associated specifically with a game or a group of related games at the computerized server.

In one embodiment a clue to the existence of and possible location of an artifact is communicated to the player during play of the game with which an artifact is specifically associated. Also in one embodiment time constraints are enforced on rewards, such that a reward may only become available for a predetermined period of time after the act of finding is communicated to the computerized game server, or may be available only for a predetermined period of time, once made available. And in one embodiment artifacts and rewards are related such that a predetermined number of a first artifacts must be found and redeemed for a first reward before a second artifact becomes available to be found and redeemed for a second reward.

DETAILED DESCRIPTION OF THE INVENTION

In various embodiments described in enabling detail herein, the inventors provide a unique method and apparatus for interaction with clients and potential clients through associated consumable media. The present invention is described in enabling detail using the following examples, which may describe more than one relevant embodiment falling within the scope of the present invention.

Figure 1:
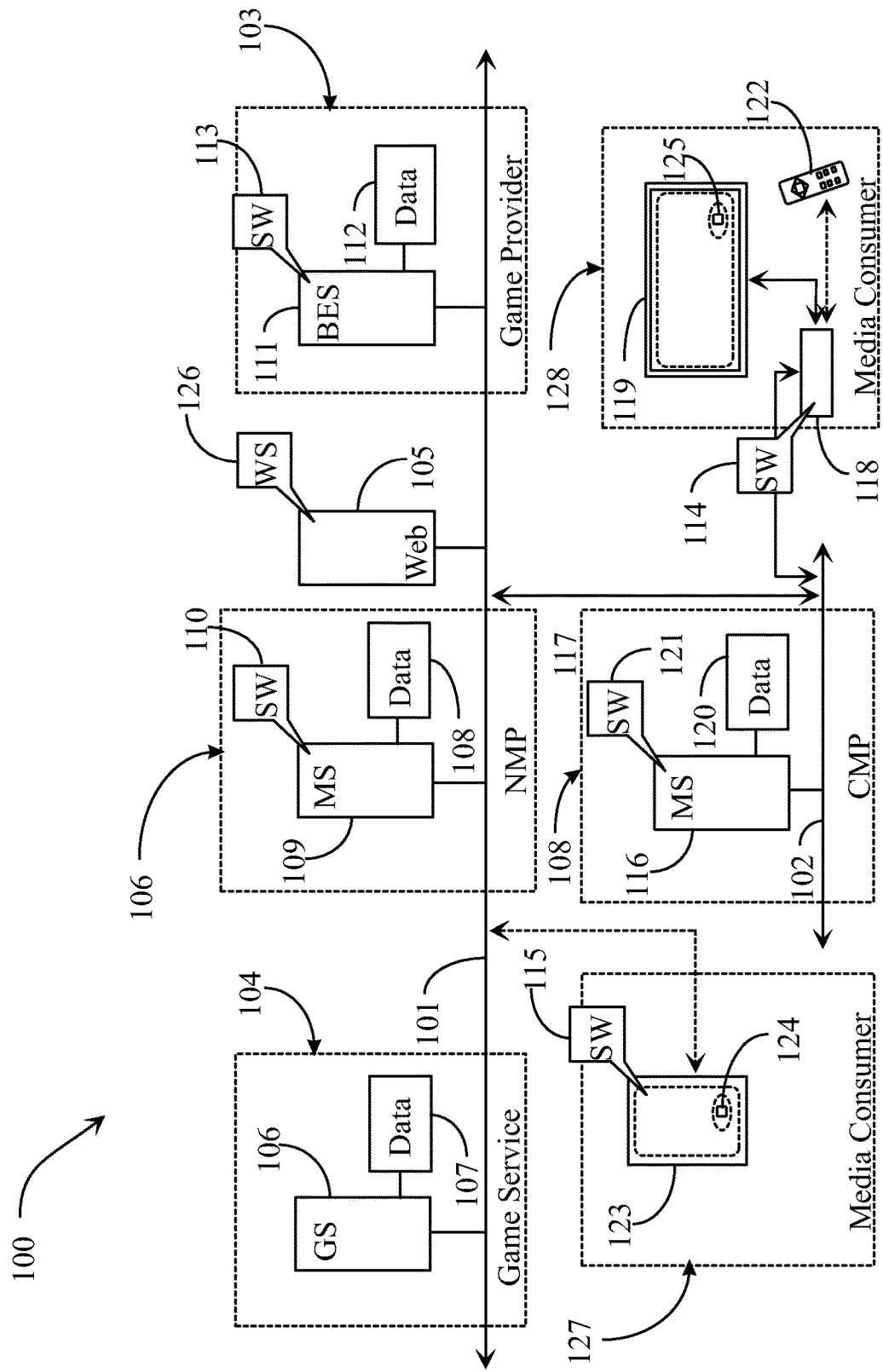
FIG. 1 is an architectural view of a communications network customer interaction management through associated consumable media may be practiced according to an embodiment of the present invention.

FIG. 1 is an architectural view of a communications network 100 over which customer interaction management through associated consumable media may be practiced according to embodiments of the invention. Communications network 100 includes an Internet network referenced herein by an Internet network backbone 101. Backbone 101 may represent all of the lines, equipment and access points that make up the Internet network as a whole, including ant connected sub-networks. Therefore, there are no geographic limitations to the practice of the present invention.

Communications network 100 includes a provider 103 of network-based games, including virtual reality environments that may be accessed and played by members who are customers of the provider. Game provider 103 includes a back-end server (BES) 111 having connection to backbone 101 running a software application (SW) 113. BES 111 includes at least one data repository 112 adapted to hold data relative to all of the business conducted by the game provider including status and history of customers of the game provider.

Game provider 103 may maintain a website (WS) 126 accessible to customers and potential customers from a web server depicted herein as web server 105. WS 126 may be a contact or access point for customers of the game provider. A user may visit website 126 and register with the game provider to play online games. Web server 105 may be a third-party server or a server maintained by the game provider from within the physical domain of the provider without departing from the spirit and scope of the present invention.

Game provider 103 may utilize a third-party game service 104 to store and serve games to customers of the provider. Game service 104 includes at least one game server (GS) 106 having connection to backbone 101 and at least one connected data repository 107 adapted to store game data for service. In one embodiment GS 106 is a cloud server. In another embodiment game provider 103 may maintain one or more game servers such as GS 106 within the physical domain of the game provider.

Network 100 includes a network-based media provider (NMP) 106. NMP 106 may include a media server (MS) 109 running software (SW) 110. MS 109 may serve movies, advertisements, news presentations, web pages, and other media types. In this example it is assumed that MS 109 is a dedicated network-based movie server for the purposes of discussion. In one embodiment MS 109 is a cloud server. MS 109 has connection to at least one data repository 107 adapted to hold media and associated data for service.

In this example a media consumer 127 has network access to MS 109 via a hand-held wireless device 123 executing software (SW) 115. Media consumer 127 may be an existing customer of game provider 103 and may frequently access games from server 106 aided in part by SW 115. Hand-held device 123 may be a smart phone, a gaming console, a laptop or notebook computer capable of accessing and playing network-based games and for downloading a movie or movie stream for consumption on the device.

In this example a cable-based media provider (CMP) 108 is depicted. CMP 108 includes a media server (MS) 116 having connection to a cable network 102 and running a software (SW) application 121. MS 116 has connection to at least one data repository 120 adapted to hold movies and associated data for service. Cable network 102 has connection to Internet backbone 101 enabling MS 116 to communicate with BES 111 in the domain of the game provider 103.

A second media consumer 128 is depicted in this example and has cable connection to network 102 and MS 116. Media consumer 128 includes an entertainment system for watching movies and for playing games or otherwise interacting with content. The system includes in this example a flat screen display 119 having connection to a processor or cable box 118 running a software (SW) application 114. A user may use a remote control device 122 for input, changing stations, and otherwise interacting with content displayed on flat screen 128.

In general use of the invention a principle or authorized entity within game-provider domain 103 may create and aggregate one or more digital artifacts, such as, for example, icons, that might be directly or indirectly associated to one or more video games or virtual reality environments that are published through the provider for access and play by members of the provider. Such artifacts may be static icons or animated Giff icons or other media elements that may be visualized and displayed within a still picture, a 3D picture, or a movie or other media presentation. In one embodiment, game provider 103 may collaborate with a media service, such as NMP 106 and or CMP 108, in order to have one or more artifacts integrated with media that may be consumed by users. At least some of these users may be registered members of the game provider. An artifact, for example, may be a type of treasure or a game character, or virtually any object that is directly or indirectly associated with the game provider including game elements from published games. Other examples may be illustrations of coins, paper money, jewels, characters from a game, and many more.

In some embodiments of the invention instantiating artifacts to be hidden in consumable media, where the artifacts are recognizable characters or other objects used in one or more games at the game provider, has an added advantage of providing artifacts that may be already familiar to players registered with the game provider, as the players frequently play games provided. The game provider, having instantiated a character, for example, as an artifact to be externally hidden, may provide interactivity with that character in games in which the character appears, such that a player may interact with the character to navigate to window where the player may authenticate having found that character externally.

Game provider 103 aided by SW 113 may notify members of the service that there are one or more artifacts hidden in a specific media source such as a new movie, a video advertisement, a Website, or the like. The artifacts may be hidden within one or more scenes of a movie or other media for consumers to find. An artifact may only briefly be visible on screen to a consumer. Artifacts may also be hidden according to levels of difficulty relative to finding the artifacts.

Game provider 103 may orchestrate a reward system for its registered members who may, for example, watch a movie or a video, and then report in the game provider's site a find of an artifact embedded in or overlaid in the presentation where the artifact is visible to consumers. In one embodiment a consumer who detects an artifact in a movie or other digital media may interact with the artifact, such as by selecting it with a remote control or other input device, and may create a record of detection of an artifact for validation back at the game provider. IN another aspect a consumer of the media may simply remember or write down, or otherwise record, where in the media presentation the artifact was witnessed.

In this example media consumer 127 is watching a movie or other media on device 123. The user has detected an artifact 124, and has interactively selected the artifact as depicted by the broken boundary surrounding artifact 124. The rectangular broken boundary on device 123 represents the media being consumed. SW 115 on device 123 may aid the consumer in interacting with the artifact and may in one implementation be responsible for inserting or embedding the artifact into one or more scenes of the movie. An artifact may be associated with one or more scenes in a movie or other media presentation directly in the digital stream authored for the presentation, or may be presented using augmented reality (AR) techniques known to and available to the inventor. In augmented reality presentation the fact of the artifact may be transparent to the enterprise providing the media presentation.

In one implementation, the game provider collaborates with a media provider to cross-promote their services to the public. For example, a media provider that serves entertainment, such as movies, may advertise to movie consumers that there is an artifact to be found in a specific movie airing at a specific time or available on demand. If a limited number of movie consumers find and interact with the artifact, which is the artifact described above, they may receive a discount on their next movie and perhaps some free game play time or virtual currency at the game provider's site. A game provider may offer some type of reward to its game site members for finding an artifact by watching a suggested movie served by the media provider. Reward might be virtual currency, free game play, or the like. In one implementation rewards may be available from both the game provider and media provider for a consumer that finds and interacts with or otherwise reports finding an artifact.

Media consumer 128 may discover an artifact 125 and select it using remote 122. SW 114 may then enable selection and insertion of the artifact into the media. In these embodiments where there is a back channel to the Internet from the media consumers network, interaction with the artifact may document the discovery, whereupon the artifact and the consumer are identified as well as the time of discovery and the media location of the discovery. This information may be passed from the respective media servers up line to BES server 111 aided by SW 113. BES 111 may then validate discoveries and forward the information to a website such as WS 126 where the consumer may visit and may collect one or more rewards. It may also be noted herein that information may also be forwarded to media account websites such as Net Flicks, etc. where there may also be rewards for the consumer for agreeing to pay for and watch the movie containing the artifacts.

It is noted herein that consumers 127 and 128 are able to automatically document their discovery of an artifact through interactive methods that records the discovery and automatically communicates the discovery on behalf of the consumer to the appropriate account servers. However, in one embodiment, a consumer may not have an interactive way of instantly communicating the discovery of the artifact. In such cases other validation methods may be used to verify that a consumer found an artifact in a media presentation. In one application a user operating a picture phone may take a documenting picture of the artifact such as by pausing the media to take the photo. A time-stamp of the photo may validate the time the artifact was discovered. There may also be a validation process such as requiring the consumer to answer one or more questions when they report a find such as what is the artifact description, name, movie name, time found, scene description, and so on.

It may also be noted herein that more than one artifact that may be closely related to a game or particular reward may be linked by clue, whereupon finding the first artifact may reveal a clue to where a second artifact may be found etc. In this case a reward may go to a consumer that was able to find all of the artifacts, or to the consumer who followed the trail to the greatest extent. The artifacts might be distributed throughout a presentation or amongst more than one presentation.

Figure 2:
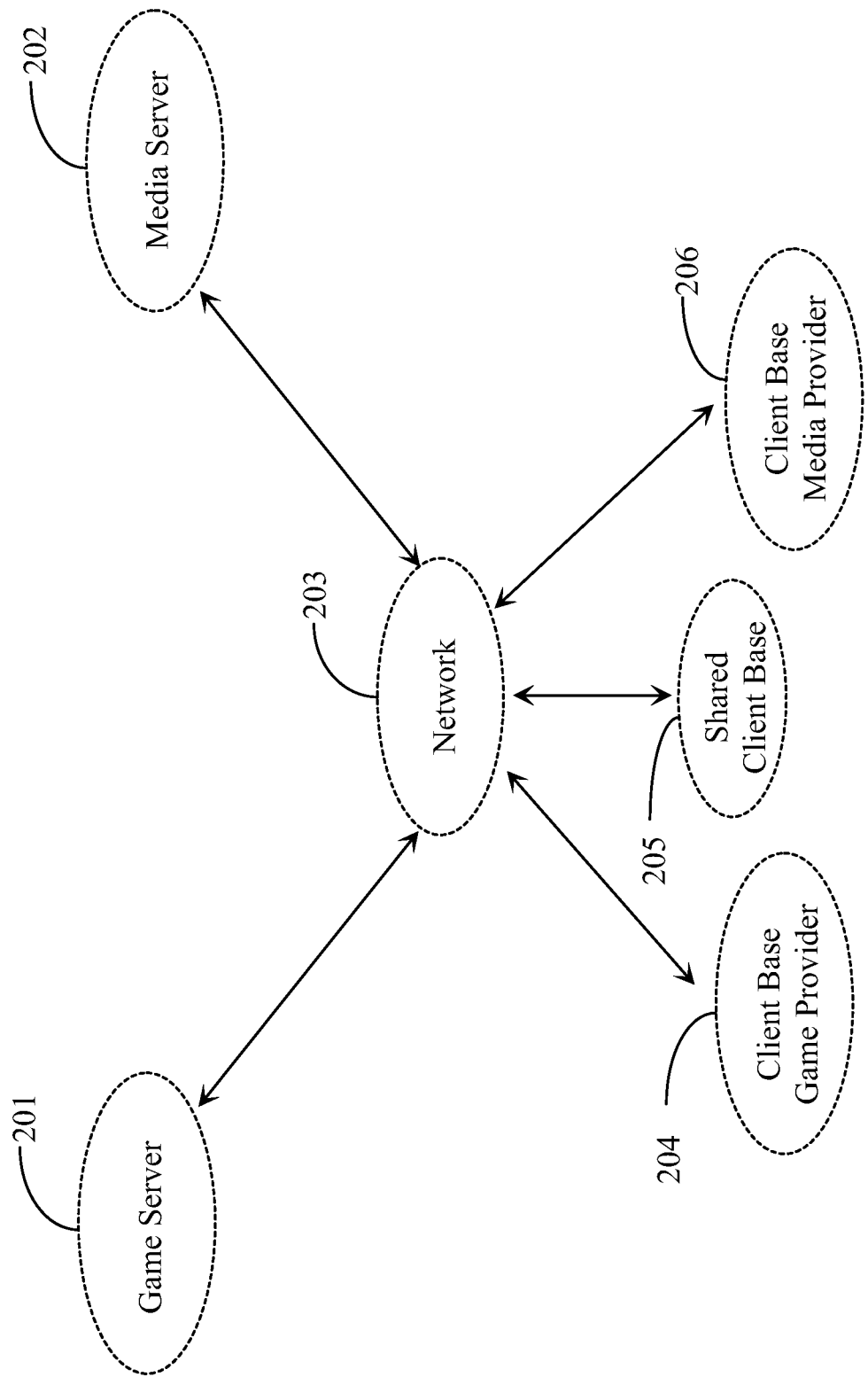
FIG. 2 is a block diagram depicting exemplary entities involved in customer interaction management through consumable media according to an embodiment of the present invention.

FIG. 2 is a block diagram depicting exemplary entities involved in customer interaction management through consumable media according to an embodiment of the present invention. The diagram depicts a game server 201 analogous to server 106 of FIG. 1. The diagram also depicts a media server analogous to server 109 of FIG. 1. Network 203 represents the Internet network in this example. A client base 204 of a game provider may connect to network 203 and may consume games from server 201 with authorization and media from server 202 with authorization. A client base 206 of a media provider may consume games from server 201 with authorization and media from server 202 with authorization.

It may be that many members of base 204 are not authorized to consume media from server 202 and many members of base 206 are not authorized to consume games from server 201. Cross promotion of both media providers to each of the client bases may produce a shared client base 205 comprising consumers who were rewarded by one or both providers and have initiated an account with the proposed or suggested provider. In this way client loyalty may be expanded for both providers.

In such an implementation each provider may advertise the presence of artifacts in specific media that is available for consumption. If the client is a game client the game provider may advertise an artifact in a free movie made available by the media provider that the game provider may view without having an account. Part of the reward for finding an artifact may be a discount on the movie service if the consumer should open an account. By the same token if the client is a movie client, the movie provider may advertise the artifacts, and the clients that find them may get free play and a discount should they open an account with the game provider. In one embodiment the artifacts may contain codes that may authorize clients for free time at either provider site. In one embodiment a shared customer may continue to enjoy certain benefits for staying loyal to the arrangement, that is gaming through one provider and watching movies through the other provider.

In one embodiment server 202 may serve a Website where artifacts may be hidden so that the Website may enjoy traffic referred thereto from the game provider. In one embodiment the media presentation may be an advertisement or a commercial promotion of an unrelated product or service, whereby the game provider sends customers to the site using the artifact detection method in exchange for the site providing discounts to those customers or simply paying the provider for the traffic.

Figure 3:
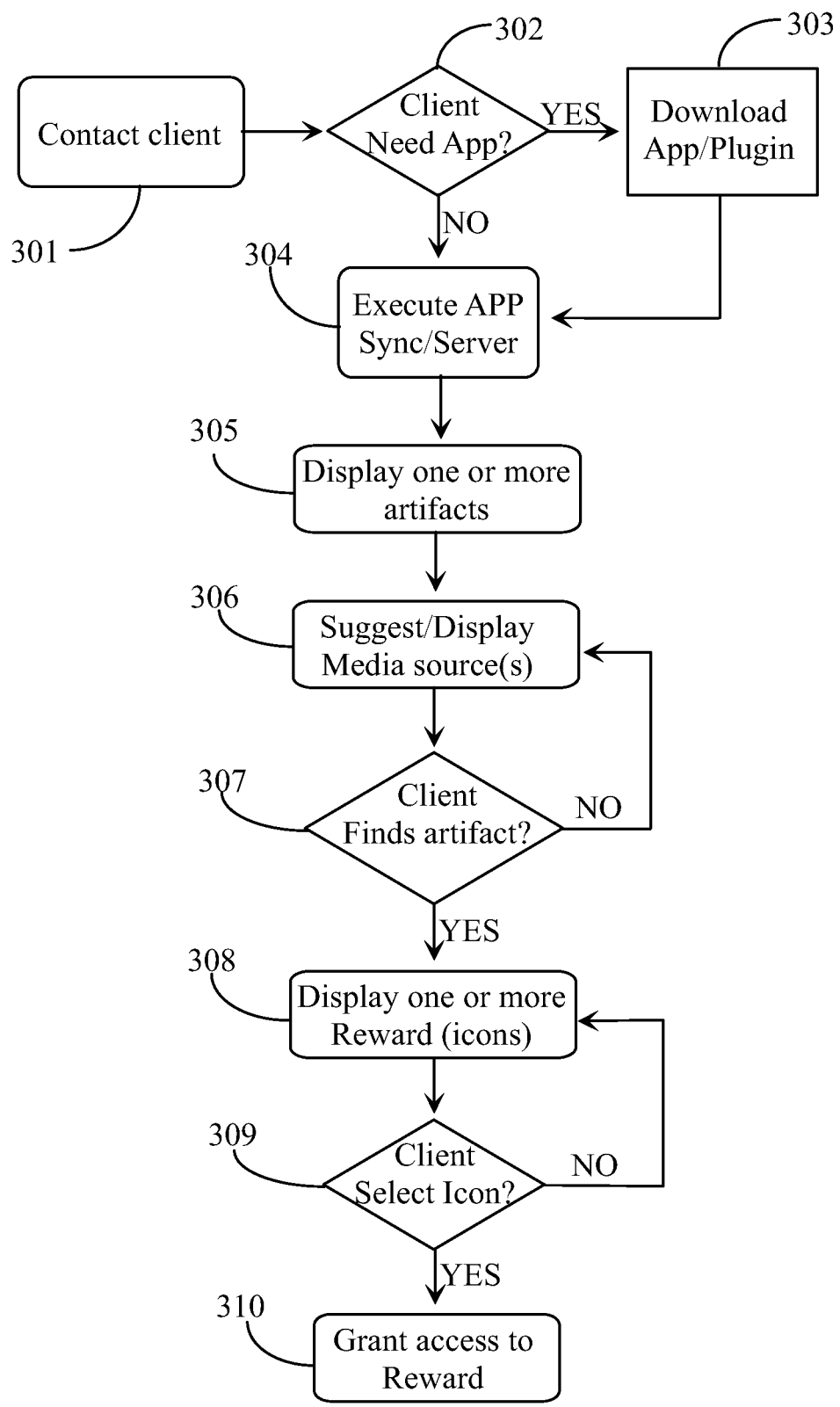
FIG. 3 is a process flow chart depicting steps for interacting with a customer according to an embodiment of the invention.

FIG. 3 is a process flow chart depicting steps for interacting with a customer according to an embodiment of the invention. At step 301, a game provider having hidden one or more artifacts in one or more media presentations may contact or notify one or more clients. At step 302 it might be determined whether the client needs an application or plug-in. Such and application or plug in may be useful in that the application may not only improve the client's gaming experience but may also enable the client to hunt for hidden artifacts in a more secure and efficient manner.

If at step 302 if a client app or plug-in is not required, it may be assumed that the client already has the application or plug-in installed and in working order and the process may move directly to step 304. If at step 302 the client requires an application or plug-in, the process moves to step 303 where the client may download the application or plug-in. The purpose of the application or plug-in may be to enable the client to stay updated regarding the game provider's campaign of cross-promotion with one or more media providers, which may include hiding artifacts in media provided by those one or more sources. For example, a client must know beforehand what he or she is looking for in a media presentation, and may want to know what rewards are available for finding artifacts.

At step 304, the client with the application or plug-in executed and running on the client's device may synchronize with a game provider server such as BES 111 or another server dedicated for the purpose of presenting new data about what artifacts are available to find. At step 305 the client application or plug-in may display one or more artifacts to the client, the artifacts being the latest artifacts that are hidden, and that must be found in order to collect one or more rewards. Information may also be presented in the application relative to artifacts that are no longer active or have been found and what rewards were collected and by what other clients. It is noted that some artifacts may be of a nature, like treasure, that once found, will be no longer at the place where they were first found. Others may be of a nature that they may be found numerous times by different persons, because they remain where found.

At step 306, the application or plug-in may suggest and display one or more media providers and media sources that may display the presently hidden artifacts. For example, an artifact may be hidden in the movie "Independence Day" available through a Netflix™ server. If the client has no account, the plug-in may provide a temporary pass code to enable the client to watch the movie and try to find the artifact without an account. Should the client agree to access the media, the media provider may offer a discount to the client or a period of free viewing should the client set up an account.

It may be determined at step 307 whether the client has found an artifact. Such determination may be made any time after one or more artifacts are hidden, as some clients may ignore a new artifact post, while some others may venture to find the artifact. In one embodiment a time limit for discovering one or more artifacts may be enforced, and an event may expire even if no clients find the artifact. In another embodiment an event may stay alive until all of the hidden artifacts are found.

If at step 307 it is determined that a client has not found the artifact, the process may resolve back to step 306. If it is determined that the client found an artifact at step 307, the process may move to step 308 where the system may display one or more reward icons or notifications. In one embodiment the system determines that a client has found an artifact immediately after the find, through a notification to the game provider server made from the media server that detected the client activity. The client action may be selecting the artifact interactively, thus triggering notification of the find. The media server may include SW analogous to SW 110 or to SW 121 of FIG. 1 that detects the client interactions with the media presentation and that includes identification of the client and the fact that the client is a member of the gaming provider.

Referring now back to step 308, the client may be shown several reward icons that the client may choose from to claim a reward. At step 309 the game provider may determine whether the client has selected a reward icon. If it is determined at step 309 that the client has not selected a reward icon the process may resolve back to step 308. In one embodiment a time frame may be enforced such that if the client fails to claim a reward within the time frame the reward may expire and the client may forfeit the reward. In another embodiment a reward may only be available after a certain time period has elapsed, following a notification that an artifact has been found. If at step 309 it is determined that the client has selected a reward icon, the system may enable the reward selected at step 310, such as by adding the reward to the client's account or otherwise making the reward available to the client. The mechanics of this process may depend at least in part on the nature of the reward. For example, if the reward is virtual currency, the reward may be automatically added to a client's balance. If the reward is free game play, the system may send the client a pass token or code to access the game.

In some embodiments there may be specific relationships among different artifacts and rewards. For example, there may be a hierarchical relationship wherein a reward A, for finding artifact(s) A may have a certain value, and a reward B may have a substantially higher value. The relationship may be that artifact B only becomes available to be found if a certain number of artifacts A have already been found and credited to a same client. The client then finding artifact B may redeem reward B.

It is noted herein that the process shown in FIG. 3 describes an automated process that does not require the client to input any data accept for finding and selecting the hidden artifacts and selecting the reward icon. The act of the client may be automatically validated as the act may be documented at the media server and forwarded to the server used by the game provider to account for finds and reward distribution. In another embodiment a client might be required to report a find wherein the find must be validated before a reward is available to the client. In this case there may be interaction with the client to verify the act of finding the one or more artifacts.

Figure 4:
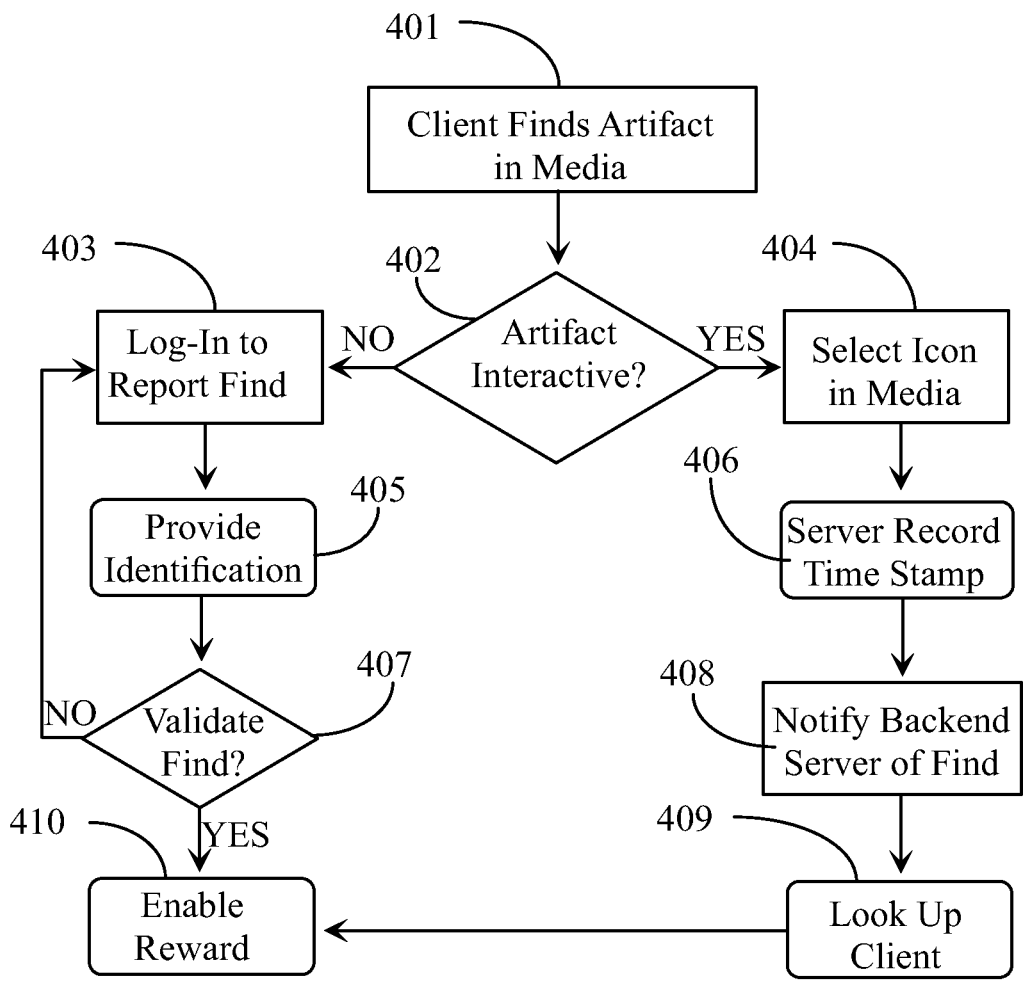
FIG. 4 is a process flow chart depicting steps for interacting with a customer according to another embodiment of the invention.

FIG. 4 is a process flow chart depicting steps for interacting with a customer according to another embodiment of the invention. At step 401 it is assumed that a client has found an artifact hidden in a media presentation. The media presentation may be, for example, a movie presented by the game provider or by an enterprise in cooperation with the game provider without departing from the spirit and scope of the present invention. The media in question may also be a movie clip, a movie trailer, an advertisement, a Website a catalog, or other media types that may support AR manipulation.

At step 402 the client may determine if the artifact found is interactive or not. If the artifact is found to be interactive in the media at step 402, the process may move to step 404 where the client may select the artifact in the media. Selection of the artifact may be made by remote control, computer input, or by other methods depending upon the device that has accessed the media. Once the artifact is selected at step 404, the server may receive the interactive signal and record and time stamp the event at step 406. This provides a validation record of the event including identifying the client that made the selection.

At step 408 the server may notify the server used by the game provider to account for discoveries and rewards. The accounting server may be analogous to BES 111 running SW 113. The server may look up the client after receipt of the notification at step 409. At step 410 the server may enable the reward for the client. In this step the client may be served one or more reward icons representing different awards from which the client might choose. Selection of an award initiates account settings modification to install the award. A reward may be virtual currency, membership discount, free game play, and so on. In one embodiment other types of awards may also be offered such as free products that are outside of the scope of the game provider. That is to say they may source from a third party including a media provider.

If at step 402 the client determines that the artifact is not interactive, the process may move to step 403 where the client may log-in to his or her account at the game provider to report a find. In one aspect of the method the client may have a picture phone that may record a movie scene where the hidden artifact has become visible and wherein the movie has been paused for the purpose of taking the picture. SW on the picture phone may record the time and day, the global position satellite coordinates, the identity or alias of the user, and the identity of the artifact (picture). This record may be uploaded at step 405 to the server for example, if the user uses the device to access the server used by the game provider Likewise, the user may transfer the record to another device used to log-in to the server.

At step 407, the server aided by SW may determine whether or not the find submitted at step 405 is valid. The picture and associated data are sufficient for the server as the SW may provide optical recognition and data parsing capabilities to the server for disseminating client records. If at step 407 the server cannot validate a find, the process may loop back to the reporting stage. If the server validates the find at step 407 the process may move to step 410 where the server may enable the reward for the find.

In one aspect of the method, at step 405 the client has no record but is time stamped at log-in. In such a circumstance, the server aided by SW may present one or a set of questions to the client to gather information from the client about the find. For example, which artifact was detected, which media was accessed, scene number (if available) of the scene where the artifact was detected, and so on. A Captcha test or the like may also be provided to ensure the client is a human operator.

It is noted herein that the SW routine may vary according to how the client accessed the media and how the client recorded the find of a hidden artifact. In one embodiment there may be multiple artifacts hidden at ascending levels of difficulty, wherein the client may be required to collect them all for a reward. Clients may compete against one another to find artifacts and collect a reward. In one aspect, rewards may be given to all who find the artifacts within an allotted time frame. In another aspect, only the first client to find an artifact may be rewarded.

Figure 5:
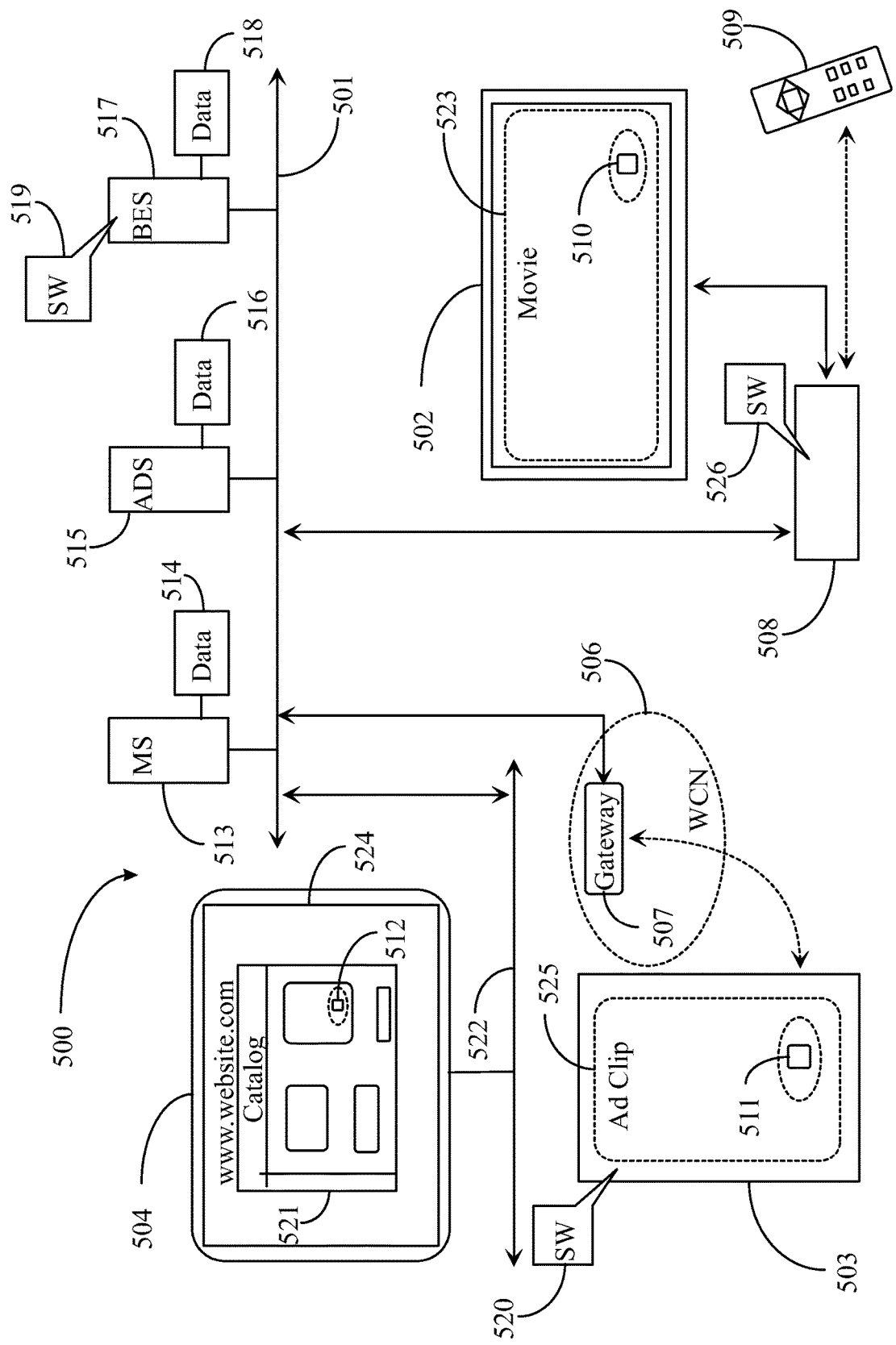
FIG. 5 is an architectural overview of a communications network over which customer interaction management through consumable media may be practiced according to another embodiment of the invention.

FIG. 5 is an architectural overview of a communications network 500 over which customer interaction management through consumable media may be practiced according to embodiments of the invention. Network 500 includes an Internet network 501. Backbone 501 supports a media server 513 and connected data repository 514. Sever 513 and data repository 514 may be analogous to server 109 and repository 108 of FIG. 1. It may be assumed that media server 513 is running a software application such as SW 110 of FIG. 1.

Internet backbone 501 also supports a back-end server 517 running SW 519 and having connection to a data repository 518. These components may be analogous to like components of game provider 103 of FIG. 1. Backbone 501 also supports an advertisement (ADS) server 515. Ad server 515 may be a third party server that serves digital ads to media content that is served to individuals over the network. For example, an advertisement may be inserted into a video stream in a music video. An advertisement may be a short video clip that may also be triggered to run automatically at the front of another media presentation. Ad server 515 has connection to a data repository 516 adapted to hold ad data for service.

In this exemplary architecture there are three consumers. One consumer operates a computer display 504 supported by a sub-network to the Internet such as a local area network (LAN) or small office or home network 522. Another consumer operates a smart phone 503 running SW 520 analogous to media consumer 127 of FIG. 1. Device 503 has connection to Internet 501 through a wireless carrier network (WCN) 506 through a gateway or network bridging appliance 507. A third consumer operates a home entertainment system including a flat screen display (television) 502 and a cable or smart box 508 running SW 526, and a remote control 509 analogous to the components of media consumer 128 of FIG. 1. Box 508 may also connect to a local cable network-based media provider such as provider 108 of FIG. 1 without departing from the spirit and scope of the present invention.

In one embodiment BES 517 of the game provider may collaborate with an advertisement agency represented herein by ad server 515. Server 517 may, with the aid of SW 519, insert artifacts into advertisements served by ad server 515. Ad server 515 may be maintained by one enterprise and may only hold and serve ads for that enterprise or it may be a third-party server holding and serving ads for multiple enterprise clients. Such advertisements may be short video/audio clips that are inserted into other media content such as music videos and the like that are consumable on the network. One such ad clip may be ad clip 525 running on device 503.

Ad clip 525 may be a short ad that plays before a music video starts, for example. In one embodiment server 517 may insert one or more artifacts into advertisement 525 with the aid of SW 519 before the ad is propagated over the network. In another embodiment device 503 may hide an artifact into advertisement 525 with the aid of SW 520 using an augmented reality technique. Artifact 511 is depicted within advertisement 525. For example, the ad may be an auto insurance advertisement where artifact 511 is inserted, overlaid, or otherwise integrated into the advertisement at some point being discoverable by a consumer watching the advertisement. A consumer may interact with artifact 511 primarily by selecting the artifact.

In one embodiment artifacts may be inserted dynamically into web content such as into a product catalog 521 of a website 524 displayed on computer 504. An artifact 512 is embedded in this case into an interactive product advertisement among other catalog ads that might be selected. A consumer may search through a catalog for an artifact that, if found, may trigger some discount for the product advertised as well as points, dollars, or free play at the gaming site. The basic process for recording a find as was described further above may also be applicable to artifacts found in web content such as an interactive catalog.

In one implementation the game provider selects products from other enterprises that the game provider feels that its customer base would like, and inserts one or more artifacts into those product advertisements. In one embodiment the game provider may notify clients of a web-based product catalog and may provide a link to the website making the catalog available. The game provider may or may not reveal the product advertisements that contain hidden artifacts. In one embodiment multiple different artifacts may be distributed into multiple catalog ads where a consumer must find them all before collecting a reward. The artifacts may be hidden from the consumer until the consumer clicks on an advertisement in the catalog, which may then render the artifact visible. One example might be rooms of a resort or hotel that may be displayed on the website of the resort and where the artifact may be an embed or overlay on the room picture. A consumer finding the artifact may get a free room for one night, etc.

In one embodiment of the invention physical artifacts may be created and distributed to physical locations such as at Starbucks, or some other franchised location such as a restaurant, cafe, etc. where people gather. The game provider may notify consumers of the locations where artifacts may be hidden. A consumer finding an artifact may record the find using a smart phone running software of the present invention that may record date and time, a picture of the artifact, and GPS coordinates of the artifact. The consumer may then log-in to the game provider server to report the find by uploading the record as described further above in FIG. 4 for a non-interactive artifact.

It is to be noted that hidden artifacts in embodiments of the present invention, and presentations in which artifacts may be hidden and found, are not limited to digital presentations, and also are not limited to visual presentations. Presentations may be passive images, and artifacts may also be passive. Presentations may in some embodiments be entirely audio, and artifacts may be short audio clips.

In one embodiment of the invention a system may comprise, for example, a computerized game server having a processor coupled to a data repository, the server executing software on the processor, serving video games to a player operating a computerized appliance having a display screen, the computerized appliance coupled to the computerized server over a wide area network (WAN), and providing interactive interfaces enabling interaction between the system and players, and a sensory presentation, that is a presentation in which human senses may interact, comprising one or both of audio and images accessible to the player, the sensory presentation including an artifact hidden in one or more of the images, or in the audio in the sensory presentation. In this embodiment the player may find the artifact hidden in the sensory presentation, communicate the act of finding the artifact and circumstances of the act to the computerized game server, and the game server may provide a predetermined reward to the player for the act of finding the artifact.

In various embodiments the sensory presentation may be a digital, visual presentation presented on the display screen of the computerized appliance operated by the player, and the artifact is a digital, visual artifact hidden in an image in the digital, visual presentation. Also in some embodiments the digital, visual presentation may be one of a movie, a video presentation or an image in a page of a web site on the Internet network. In some embodiments the digital, visual artifact is interactive, and selection of the interactive digital artifact by the player initiates navigation on the WAN, communicating the act of finding the artifact and circumstances, including the player's identification, to the computerized game server. Also in some embodiments the sensory presentation may be a passive image, and communication by the player of the act of finding is by input at one of the interactive interfaces at the computerized game server.

In some embodiments of the system the passive image is an image on a billboard, in a newspaper, in a magazine, or in a printed advertisement. In some embodiments the sensory presentation may an audio presentation, and the artifact may be a short audio clip somewhere in the audio of the presentation. Further in some embodiments the predetermined reward may comprise one or more of virtual currency, enhanced capability in game play, and recognition posted through one of the interactive interfaces provided by the first server. In some embodiments the artifact may be associated specifically with a game or a group of related games at the computerized server. And in some embodiments clues to the existence of and possible location of an artifact is communicated to the player during play of the game with which an artifact is specifically associated.

It will be apparent to one with skill in the art that the consumer interaction system and apparatus of the invention may be provided using some or all of the mentioned features and components without departing from the spirit and scope of the invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A system, comprising:
    a computerized game server hosted by a game provider, having a processor coupled to a data repository, the computerized game server executing first software on the processor, serving video games on an Internet connection to players registered as members of the game provider, the registered players operating computerized appliances having display screens, the computerized appliances providing interactive interfaces enabling interaction between the system and players;
    one or more digital interactive artifacts created and stored at the computerized game server;
    a media server, distinct from the game server and hosted by a media enterprise distinct from the game provider, connected to the Internet network and executing second software;
    a video presentation streamed by the media server, comprising one or both of audio and images accessible to the player using the computerized appliance also used to play the games streamed by the game server; and
    third software provided by the game server, executing on individual ones of the computerized appliances used by the registered players to play games streamed by the game server and to consume media streamed by the media server;
    wherein the game server and the media server, executing the first and second software, communicate over the Internet, providing the digital interactive artifacts to the media server via the Internet, the media server, executing the second software, integrates one or more of the digital interactive artifacts into the sensory video presentation, the game server, through the third software executing on individual ones of the computerized appliances, notifies the registered players that a specific artifact is hidden in a specific video presentation streamed by a specific media enterprise, one of the players views the video presentation, finds the specific digital interactive artifact hidden in the video presentation, interacts directly with the specific digital interactive artifact through an input mechanism at the computerized appliance, the result of the interaction, through one or both of the second and the third software, initiating a message on the Internet to the computerized game server, communicating the act of finding the digital interactive artifact and circumstances, including the player's identification, and wherein the game server provides a predetermined reward to the player for the act of finding the digital interactive artifact.

2. The system of claim 1 wherein the predetermined award is issued to the player as a result of receiving the communication, and wherein the predetermined reward comprises one or more of virtual currency, enhanced capability in game play, and recognition posted through one of the interactive interfaces.

3. The system of claim 1 wherein the artifact is a media element that is visualized and displayed within the video presentation.

4. The system of claim 1 wherein time constraints are enforced on the reward, such that the reward is available for a predetermined period of time after the act of finding is communicated to the computerized game server, or is available for a predetermined period of time, once made available.

5. The system of claim 1 wherein the artifact and the reward are related such that a predetermined number of first artifacts must be found and redeemed for a first reward before a second artifact is made available to be found and redeemed for a second reward.

6. The system of claim 1 wherein the artifact, once found, is removed from the presentation, and may therefore no longer be available to be found.

7. The system of claim 1 wherein the artifact is one of a type of treasure, a game character, or virtually any object that is directly or indirectly associated with the game provider including game elements from published games.

8. The system of claim 1 wherein, upon the artifact being found, the artifact is removed from the video presentation.

9. A method, comprising:
    serving video games to players registered to a game provider by a game server, hosted by the game provider, the game server having a processor coupled to a data repository, the computerized game server executing first software on the processor, the players operating computerized appliances having display screens, the computerized appliances executing third software and coupled to the game server over an Internet network,;
    creating and storing one or more digital interactive artifacts, specific to the video games at the game server;
    communicating over the Internet by the game server with a media server distinct from the game server and hosted by a media enterprise distinct from the game provider, the media server executing second software, the communication providing a specific interactive artifact to the media server;
    integrating the specific interactive artifact by the media server executing the second software into a video presentation streamed by the media server;
    communicating on the Internet by the game server to the computerized appliances operated by the registered players the fact of the specific interactive artifact being present in the video presentation streamed by the media server;
    viewing the video presentation by one of the registered players using the computerized appliance executing third software;
    discovering the interactive artifact by the registered player in the video presentation;
    interacting with the interactive artifact by the registered player by an input mechanism at the computerized appliance, result of the interaction, through one or both of the second and the third software, initiating a message on the Internet to the computerized game server, communicating the act of finding the digital interactive artifact and circumstances, including the player's identification: and the game server provides a predetermined reward to the player for the act of finding the digital interactive artifact.

10. The method of claim 9 wherein the predetermined reward comprises one or more of virtual currency, enhanced capability in game play, and recognition posted through one of the interactive interfaces.

11. The method of claim 9 wherein time constraints are enforced on the reward, such that the reward is available for a predetermined period of time after the act of finding is communicated to the computerized game server, or is available for a predetermined period of time, once made available.

12. The method of claim 9 wherein the artifact and the reward are related such that a predetermined number of first artifacts are found and redeemed for a first reward before a second artifact is made available to be found and redeemed for a second reward.

\* \* \* \* \*